United States Patent [19]

Kameya

[11] 4,313,202
[45] Jan. 26, 1982

[54] MODEM CIRCUITRY

[75] Inventor: Andrew M. Kameya, Medfield, Mass.

[73] Assignee: Codex Corporation, Mansfield, Mass.

[21] Appl. No.: 136,919

[22] Filed: Apr. 3, 1980

[51] Int. Cl.³ .............................................. H04B 3/04
[52] U.S. Cl. ......................................... 375/15; 375/9; 375/11; 328/166; 333/18
[58] Field of Search ................................. 375/11–15; 333/18; 328/166, 167

[56] References Cited

U.S. PATENT DOCUMENTS

| | | | |
|---|---|---|---|
| 3,727,136 | 4/1973 | Schroeder | 333/18 |
| 3,755,738 | 8/1973 | Gitlin | 333/18 |
| 3,775,685 | 11/1973 | Eggimann | 375/11 |
| 3,868,603 | 2/1975 | Guidoux | 333/18 |
| 3,878,468 | 4/1975 | Falconer | 375/15 |
| 3,978,407 | 8/1976 | Forney | 333/18 |
| 4,004,226 | 1/1977 | Qureshi | 333/18 |
| 4,087,449 | 4/1978 | Wash | 364/900 |
| 4,089,061 | 5/1978 | Milewski | 375/13 |

OTHER PUBLICATIONS

P. J. Van Gerwen, N. A. M. Verhoeckx, H. A. Van Essen and F. A. M. Snijders, "Microprocessor Implementation of High–Speed Data Modems", IEEE Transaction on Communications, vol. COM–25, No. 2, Feb. 1977, pp. 238–250.

K. Watanabe, K. Inoue and Y. Sato, "A 4800 Bit/s Microprocessor Data Modem", IEEE Transactions on Communications, vol. COM–26, No. 5, May 1978, pp. 493–498.

Primary Examiner—Benedict V. Safourek
Assistant Examiner—Stephen Chin

[57] ABSTRACT

Modem receiver featuring digital phase splitting filter circuitry for storing a changing sequence of successive said samples, multiplying a single, real-valued, stream of said stored samples respectively by coefficients, and combining the products of said multiplication to provide a complex-valued output consisting of a pair of output streams having associated carrier frequencies which, due solely to the selection of said coefficients, are equal but 90° apart in phase, said coefficients being selected to establish a relationship between said outputs and said stored samples corresponding to bandpass filtering having an amplitude or phase response that does not exhibit symmetry in the frequency spectrum about the frequency of said carrier, and means for thereafter demodulating and encoding said output streams.

4 Claims, 5 Drawing Figures

MODEM CIRCUITRY

BACKGROUND OF THE INVENTION

This invention relates to modem apparatus in which a received, modulated double sideband carrier signal, representing digital bits, is converted to a stream of digital samples which are then filtered and demodulated.

P. J. Van Gerwen, N. A. M. Verhoeckx, H. A. Van Essen and F. A. M. Snijders, "Microprocessor Implementation of High-Speed Data Modems," *IEEE Transactions on Communications*, Vol. COM-25, No. 2, February 1977, pp. 238–250 shows a microprocessor implemented modem receiver wherein an incoming QAM signal passes through two digital phase-splitting filters prior to demodulation.

K. Watanabe, K. Inoue and Y. Sato, "A 4800 Bit/s Microprocessor Data Modem," *IEEE Transactions on Communications*, Vol. COM-26, No. 5, May 1978, pp. 493–498 shows a microprocessor implemented modem receiver in which a bandpass filter is followed by a digitally implemented "90° phase splitter," which is in turn followed by a demodulator.

Falconer et al., U.S. Pat. No. 3,878,468 shows a modem receiver having analog phase splitting filters followed by demodulation.

Qureshi et al., U.S. Pat. No. 4,004,226 (FIG. 2), Walsh et al., U.S. Pat. No. 4,085,449 (FIG. 4) and Forney et al., U.S. Pat. No. 3,978,407 (FIG. 6) all show demodulation preceeding low pass filtering.

SUMMARY OF THE INVENTION

In one aspect the invention features digital phase splitting filter circuitry for storing a changing sequence of successive said samples, multiplying a single, real-valued, stream of said stored samples respectively by coefficients, and combining the products of said multiplication to provide a complex-valued output consisting of a pair of output streams having associated carrier frequencies which, due solely to the selection of said coefficients, are equal but 90° apart in phase, said coefficients being selected to establish a relationship between said outputs and said stored samples corresponding to bandpass filtering having an amplitude or phase response that does not exhibit symmetry in the frequency spectrum about the frequency of said carrier, and means for thereafter demodulating and encoding said output streams.

In preferred embodiments, the digital circuitry has switching means for changing the coefficients to cause the amplitude response to exhibit even symmetry about the carrier frequency; and the digital circuitry has switching means for changing the coefficients to cause the response to exhibit odd symmetry about the carrier frequency.

Freed from the requirement of a symmetrical response, the filter coefficients may thus be chosen so that the filter may be made to do compromise equalization, e.g., in addition to its basic filtering and phase splitting functions.

Other advantages and features will appear from the following description of the preferred embodiment, and in the claims.

DESCRIPTION OF THE PREFERRED EMBODIMENT

We first briefly describe the drawings.

Drawings

Structure

Figure 1:
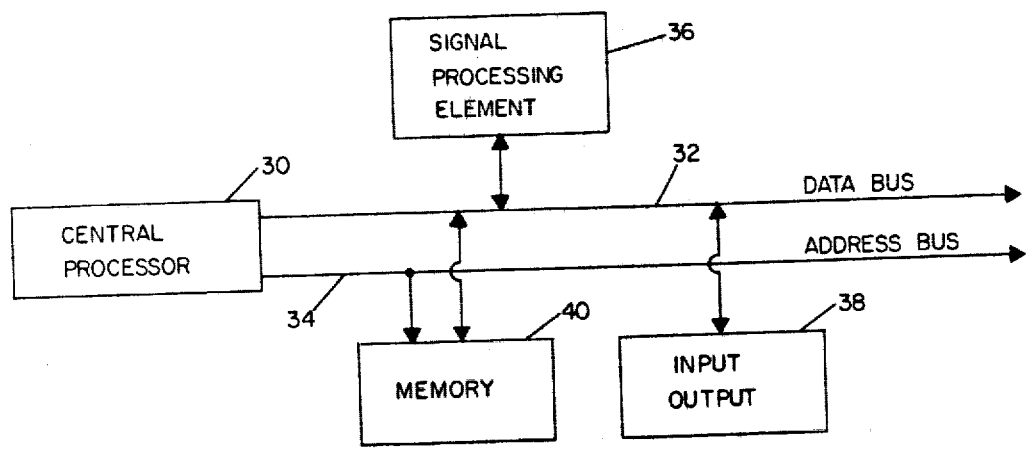
FIG. 1 is a general block diagram of a receiver embodying the invention.

Referring to FIG. 1, the receiver has a central microprocessor (MPU) 30 (the Motorola 68B00 general purpose microprocessor chip), connected to data bus 32 and address bus 34. Signal processor element (SPE) 36 and input/output circuitry 38 are also connected to bus 32. MPU memory 40 is connected to both buses.

Figure 2:
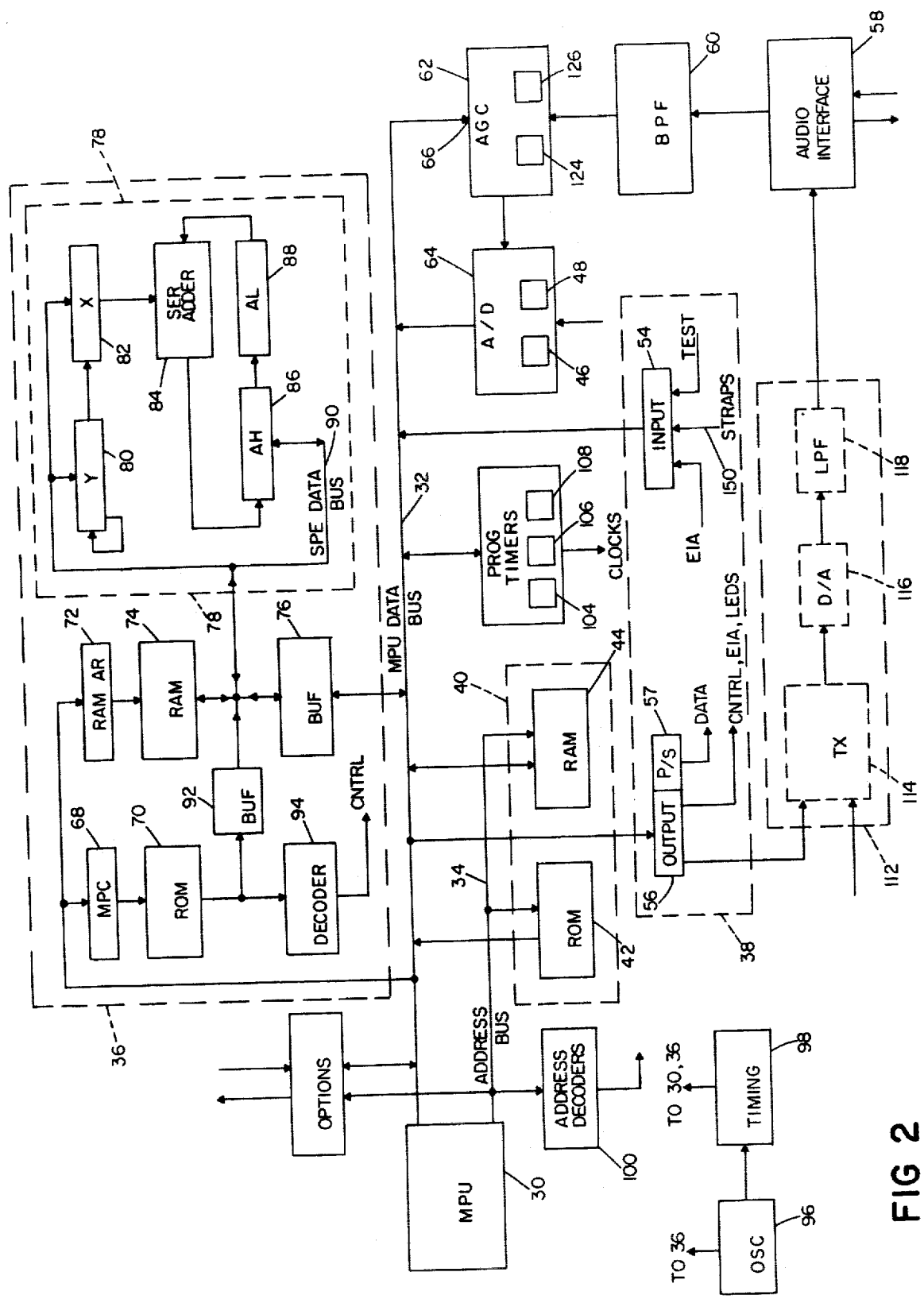
FIG. 2 is a more detailed block diagram of the receiver.

Referring now to FIG. 2, MPU 30 has a 4K×8 bit ROM program memory 42, from which MPU 30 executes instructions, and a 256×8 bit RAM data memory 44. MPU 30 interfaces with conventional data terminal equipment and the modem front panel (straps, test switches, indicators, and the like), through input and output registers 54 and 56.

Audio interface 58, band pass filter 60, AGC element 62, and A/D converter 64 are arranged to initially process received signals and put them on data bus 32. Bus 32 also has a control connection 66 directly to element 62.

Converter 64 has a sample-and-hold circuit 46 clocked at 7200 samples/sec., and an 8 bit A/D element 48.

AGC element 62 consists of an 8 bit latch 124 connected to multiplying D/A converter 126. Latch 124 is arranged to receive a coarse gain control signal g from MPU 30, once during each symbol interval and to pass g to multiplying D/A converter 126, thus producing an output voltage $v_{out}$ proportional to the product of g and input voltage $v_{in}$.

SPE 36 is an independent, programmable digital processor which is loosely coupled to, and executes tasks under the control of, MPU 30. Three elements of SPE 36 are connected to data bus 32: microprogram counter (MPC) 68, which can be loaded by MPU 30 and determines the next instruction address in 1K×8 bit ROM program memory 70 for SPE 36; random access memory address register (RAM AR) 72, which can also be loaded by MPU 30 and points to the operand in 256×8 bit data memory 74; and 8 bit read/write buffer 76, through which MPU 30 and SPE 36 can exchange data.

Arithmetic unit 78, in SPE 36, has two 8 bit registers, Y register 80 and X register 82; a serial adder 84 which can receive, in sequence, the data stored in X register 82; and two bit 8 accumulators, "high" accumulator AH 86 which stores the 8 most significant bits of a 16 bit number and "low" accumulator AL 88 which stores the remaining 8 bits. Y register 80, X register 82, and AH 86 are all connected through SPE data bus 90 to SPE data memory 74, read/write buffer 76, and intermediate buffer 92. Intermediate buffer 92 is in turn connected to SPE program memory 70.

SPE 60 also has an instruction register decoder 94 connected to SPE program memory 70.

Crystal oscillator 96 generates a 7.3728 MHz clock signal which is provided to SPE 36 and to frequency division circuitry 98. The output of frequency division circuitry 98 is a 1.8432 MHz clock signal which is provided to MPU 30.

Address decoders 100 connect with all components connected to MPU data bus 32.

Three programmable timers 104, 106, and 108 are provided. Timer 104 is frequency controlled by MPU 30 and generates an adjusted clock from which a sample clock signal for A/D converter 64 as well as a receive bit-rate clock signal for the terminal are derived. Timer 106, also frequency controlled by MPU 30, generates and supplies to MPU 30 a software timing clock. Timer 108 is in communication only with MPU 30, can be reset to a predetermined time interval by MPU 30, and serves a "watchdog" function described below.

Shown in phantom in FIG. 2 are elements that participate in the modem transmitter; LSI transmitter chip (e.g., Motorola Part Number 6862) 114, D/A converter 116, and low pass filter 118, connected between output register 56 and audio interface 58.

Figure 3:
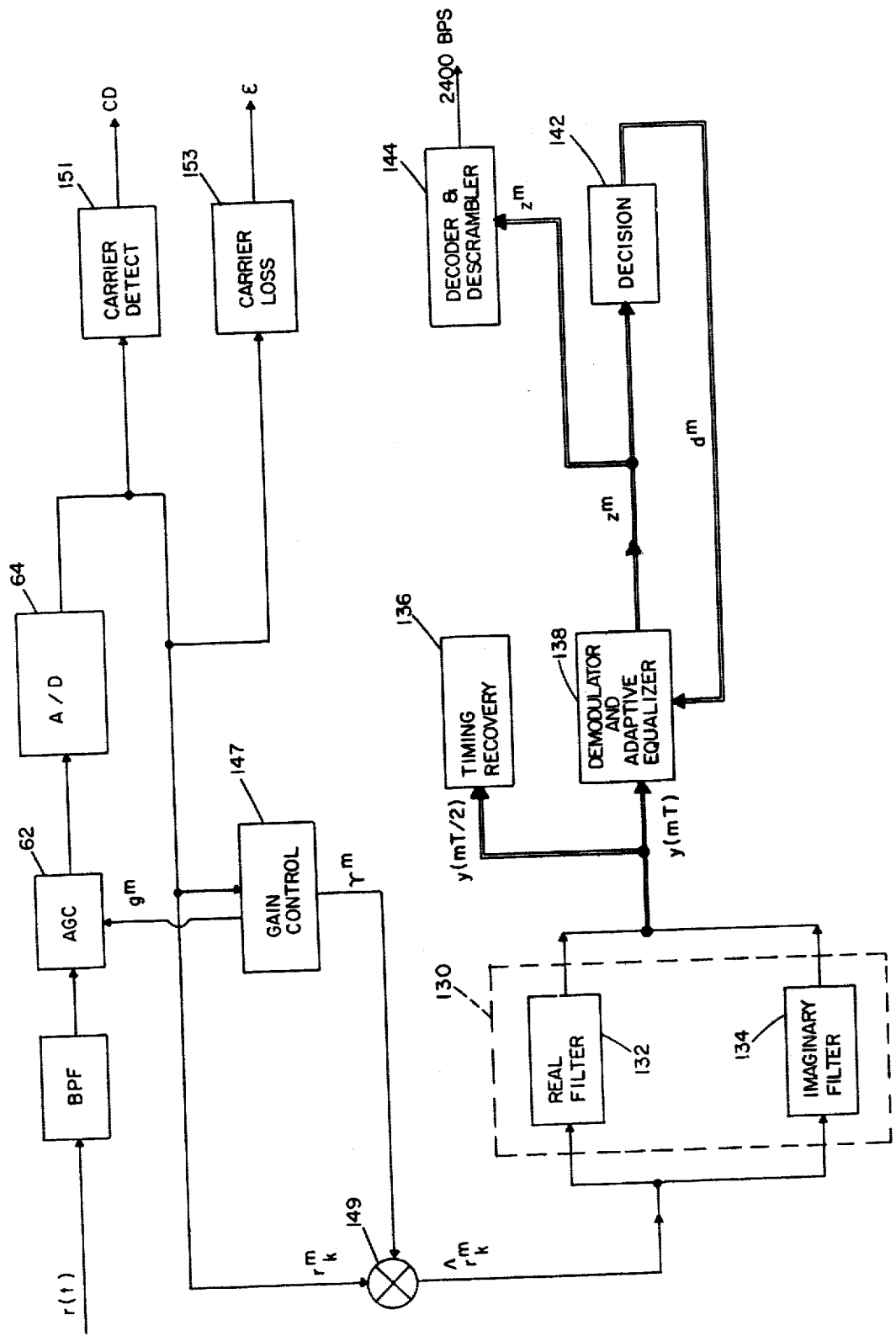
FIG. 3 is a block diagram illustrating procedures carried out by microprocessor circuitry in the receiver.

MPU 30 and SPE 36 are programmed to effect the further model "circuits" shown generally in FIG. 3. In particular, there is effected a non-recursive, digital, phase splitting "filter" 130, with real and imaginary parts 132 and 134, which receives the output of A/D converter 64, after scaling via "multiplier" 149, and provides filtered outputs to timing recovery "circuit" 136 (at 2400 samples/sec., twice the baud rate) and to demodulation and adaptive equalization circuitry 138 (at 1200 samples/sec., the baud rate). The demodulated and equalized signal $z^m$ is passed to decision "circuit" 142, which in turn feeds "decoder/descrambler" 144 to provide a 2400 bsp digital output. The output $d^m$ of decision circuit 142 is provided to circuit 138 for use in adjusting the demodulator carrier phase and frequency and updating the adaptive equalizer coefficients.

Gain control "circuit" 147, depending on the strength of signals received from converter 64, provides coarse gain control factor g to AGC element 62 and fine gain control factor $\gamma$ to multiplier 149, located with SPE 36. Carrier detect "circuit" 151 and carrier loss "circuit" 153 monitor the strength of signals from converter 64 to determine if a data transmission has begun or terminated.

Further details of how MPU 30 and SPE 36 effect these modem "circuits" and their functions will appear in a copending U.S. patent application entitled "Modem Circuitry," filed by Shahid Qureshi on the same day as this application and hereby incorporated by reference.

Operation

In general, the modem, while on line, monitors the average strength of the signal samples produced by A/D converter 64 at a rate of 7,200 times per second. When a preselected threshold strength is exceeded, MPU 30 raises a carrier detect condition and sets an initial gain factor g for AGC 62. With carrier detected and gain initialized, the receiver enters a timing jam mode in which one out of six consecutive samples produced by A/D converter 64 is selected by MPU 30 for equalization and demodulation. Thereafter the tap coefficients of the equalizer are set to initial values.

The above steps completed, the receiver enters a data mode, wherein the AGC, timing rate, carrier phase, and equalizer tap coefficients are continually updated. The average signal strength is also continually computed; when it falls below a preselected carrier-off threshold, a carrier loss signal is raised, taking the modem out of data mode.

Further details of overall operation appear in the above-identified copending application. Aspects of the operation relating to the invention claimed herein are as follows.

We turn to a description of the receiver's operation in the data mode, assuming that the carrier detect, gain initialization, timing jam, and equalizer initialization functions have been previously carried out by the receiver.

Figure 4:
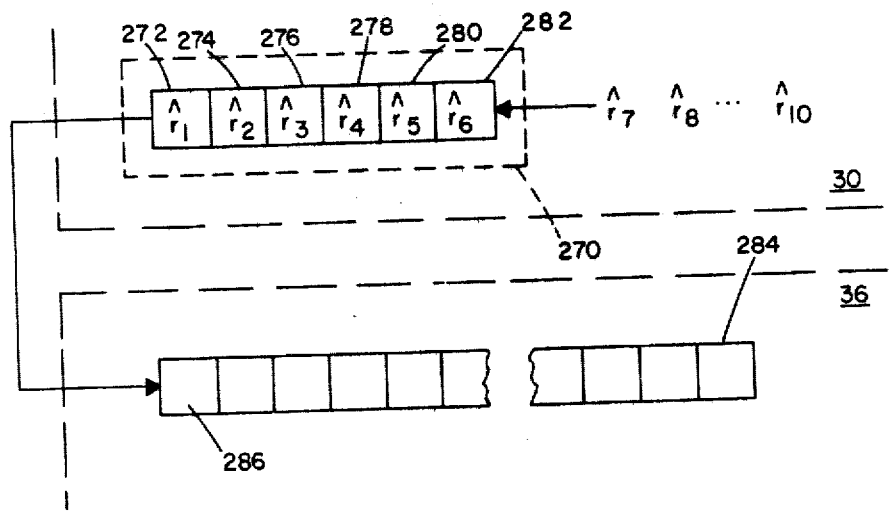
FIGS. 4 and 5 are block diagrams illustrating methods for carrying out the filtering procedures of FIG. 3.
Figure 5:
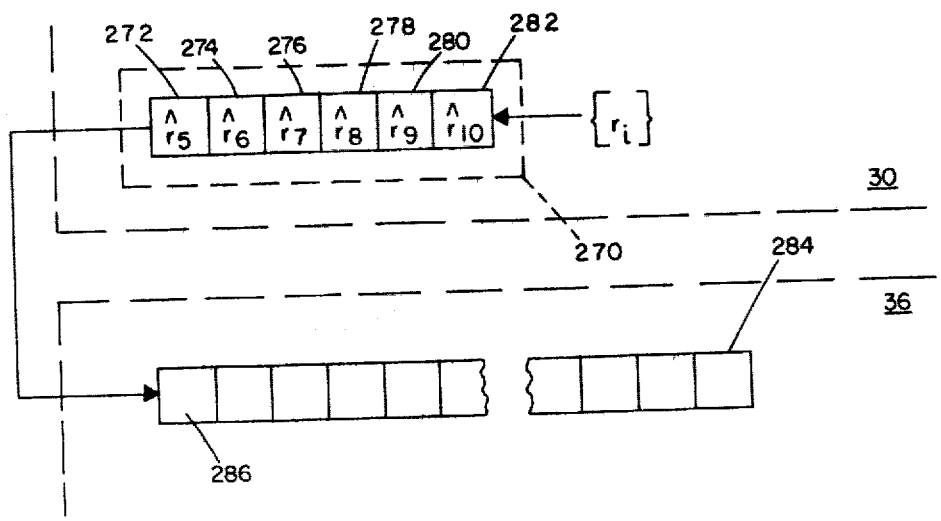

A/D converter 64 samples the incoming, band pass filtered, and gain adjusted analog signal r(t), at a rate of 7,200 samples/sec. (i.e., six times the baud rate), and outputs the samples, one at a time, to MPU 30, where each set of six samples is stored, time ordered, in a six sample buffer 270 (shown in FIGS. 4 and 5) implemented by software.

With timing jam and timing recovery properly implemented, the sixth cell of buffer 270 will contain the sample ultimately to be used for demodulation. This sample, along with five prior samples, will fill buffer 270, at which point the six samples will be sequentially transferred to SPE 36, via read/write buffer 76, beginning with the sample contained in the first buffer unit.

SPE 36 multiplies the six transferred samples by fine gain control factor $\gamma$ and enters them, in the order of their reception, into the first six units of a 21 unit delay line 284, implemented by software, wherein each unit of delay is 1/7200 sec. Based on the current contents of 21 unit delay line 284, SPE 36 now computes the output of filter 130 twice each modulation period (i.e., for the mth period, at times mT and mT-T/2 where T is 1/1200 sec.) as follows.

To compute the output of filter 130 for any given time SPE 36 begins with the sample $\hat{r}$ contained in the delay unit occupying that time slot, fetches from memory the filter coefficient corresponding to that time slot, and multiplies the two together in arithmetic unit 78, accumulating the resultant product in AH 86 and AL 88. This process is repeated for each of the 17 next most ancient samples $\hat{r}$ contained in the next 17 delay units, the final summation of the products being accumulated in AH 86 and AL 88. Thus, to compute the output of filter 130 at time mT, SPE 36 begins computations at the first delay unit and proceeds through to the eighteenth, and, to compute the output of filter 130 at time mT-T/2, SPE 36 begins computations at the third delay unit and proceeds through to the twenty-first. In either case, the computation spans 18 time slots.

The two filter outputs thus produced are designated the main sample y(mT) and the timing sample y-(mT-T/2).

The kth coefficient of filter 130, for k=0, 1, ... 17, is:

$$P(kT/6) = \hat{P}(kT/6) \exp(j2\pi f_c kT/6)$$

where $\hat{p}(kT/6)$ is the corresponding coefficient for the more conventional post-demodulator low pass filter.

The carrier frequency is $f_c = 3/2T$. So long as $f_c = n(3/2T)$, where n is an integer, then, if $\hat{p}(kT/6)$ are real, the even numbered coefficients p(kT/6), k=0, 2, 4, ..., are real and the odd numbered coefficients p(kT/6), k=1, 3, 5, ..., are imaginary. Thus, the workload of computing the output of filter 130 is reduced by one half. Most generally, if $f_c = nf_s/4m$, where n and m are integers, and $f_s$ is the sampling frequency (in this case $f_s = 6/T$), then the saving in the workload for computing the filter output is $\frac{1}{2}m$.

Since filtering is done at passband, as opposed to structures in which quadrature demodulation is followed by low pass filtering, the amplitude response of filter 130 need not have even symmetry and the phase response of filter 130 need not have odd symmetry. Thus, by appropriate choice of the coefficients p(kT/6), compromise equalization may be effected, if desired.

Memory 70 contains two sets of coefficients p(kT/6), one for providing and one for not providing compromise equalization. Choice of which set of filter coefficients SPE 36 applies is selectable via input register 54.

The main sample output of filter 130 (i.e., y(mT)) subsequently passes first to conventional demodulator and equalizer circuitry 138, and then to decision circuit 142.

Demodulation and equalization of the complex output of filter 130 may be implemented in a variety of ways well-known in the art. The demodulator or phase corrector may precede or follow the equalizer. P. J. Van Gerwen, N. A. M. Verhoeckx, H. A. Van Essen and F. A. M. Snijders, "Microprocessor Implementation of High Speed Data Modems," *IEEE* Transactions on Communications, Vol. COM-25, No. 2, February, 1977, pp. 238-250 teaches phase splitting filtering followed by demodulation. A review of prior equalization art for complex valued signals is Proakis and Miller *IEEE Transactions for Information Theory*, Volume IT-15, No. 4, July 1969. Equalization for a QAM receiver is also described in U.S. Pat. No. 4,084,226. A method of phase correction following equalization is described in U.S. Pat. No. 4,027,250.

The output of decision circuit 142 is a signal $d^m$, representing the phase of the demodulated and equalized signal $z^m$ as being within the boundaries of one of the four quadrants of the complex plane.

The output $d^m$ of decision circuit 142 is fed back to circuitry 138, for use in adjusting the demodulating carrier phase and frequency and updating the equalizer tap coefficients.

Other features disclosed above and not claimed herein were the invention of Shahid Qureshi.

Other embodiments are within the following claims.

I claim:

1. Modem receiver apparatus having means for receiving, demodulating, and decoding a modulated, double side band carrier signal encoded to represent digital bits wherein the received signal is converted to a stream of real-valued digital samples, wherein said apparatus comprises, digital phase splitting filter circuitry for storing a changing sequence of successive said samples, multiplying a single, real-valued, stream of said stored samples respectively by coefficients, and combining the products of said multiplication to provide a complex-valued output consisting of a pair of output streams having associated carrier frequencies which, due solely to the selection of said coefficients, are equal but 90° apart in phase, said coefficients being selected to establish a relationship between said outputs and said stored samples corresponding to bandpass filtering having an amplitude response that does not exhibit even symmetry in the frequency spectrum about the frequency of said carrier, and means for thereafter demodulating and encoding said output streams.

2. Modem receiver apparatus having means for receiving, demodulating, and decoding a modulated, double side band carrier signal encoded to represent digital bits wherein the received signal is converted to a stream of real-valued digital samples, wherein said apparatus comprises, digital phase splitting filter circuitry for storing a changing sequence of successive said samples, multiplying a single, real-valued, stream of said stored samples respectively by coefficients, and combining the products of said multiplication to provide a complex-valued output consisting of a pair of output streams having associated carrier frequencies which, due solely to the selection of said coefficients, are equal but 90° apart in phase, said coefficients being selected to establish a relationship between said outputs and said stored samples corresponding to bandpass filtering having a phase response that does not exhibit odd symmetry in the frequency spectrum about the frequency of said carrier, and means for thereafter demodulating and encoding said output streams.

3. The apparatus of claim 1 further comprising switching means for changing said coefficients to cause said amplitude response to exhibit even symmetry about said carrier frequency.

4. The apparatus of claim 2 further comprising switching means for changing said coefficients to cause said phase response to exhibit odd symmetry about said carrier frequency.

* * * * *